T. STARBUCK & C. P. SMALL.
Sewer-Trap.
No. 201,299. Patented March 12, 1878.
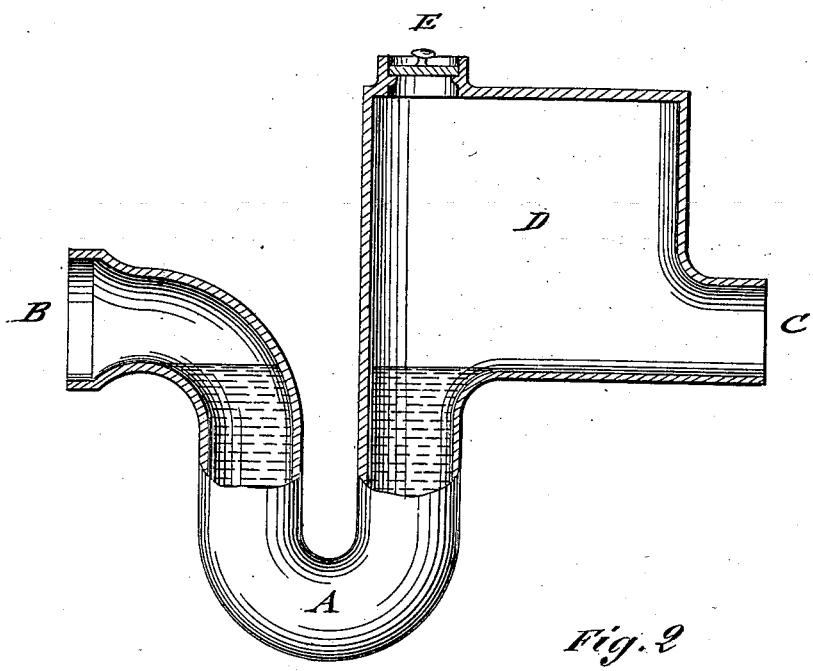
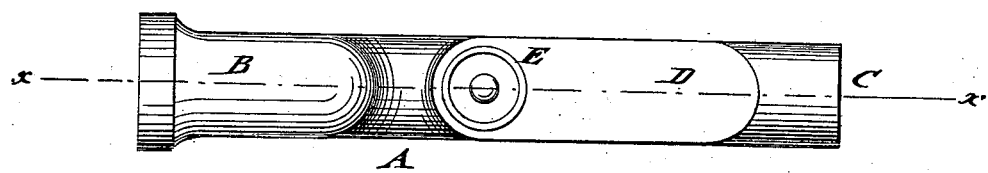

UNITED STATES PATENT OFFICE.

THEODORE STARBUCK AND CHARLES P. SMALL, OF SAVANNAH, GA.

IMPROVEMENT IN SEWER-TRAPS.

Specification forming part of Letters Patent No. 201,299, dated March 12, 1878; application filed March 12, 1877.

*To all whom it may concern:*

Be it known that we, THEODORE STARBUCK and CHARLES P. SMALL, of Savannah, in the county of Chatham and State of Georgia, have invented a new and Improved Sewer-Trap, of which the following is a specification:

The object of our invention is to furnish an improved sewer-trap, by which the escape of sewer gas or stench into the outer air or house by the siphoning of the common traps may be prevented, and the trap also be easily kept clean, the same being of simple, cheap, and durable construction, and especially advantageous under basins, sinks, and other small water-fixtures, as they are more liable to siphoning.

The invention consists of an automatic sewer-trap having an enlarged chamber at the outlet or heel of trap, said chamber being provided with a hand-hole and plug for cleaning.

In the accompanying drawings, Figure 1 represents a vertical longitudinal section of our improved sewer-trap on line $x\,x$, Fig. 2, and Fig. 2 is a top view of the same.

Similar letters of reference indicate corresponding parts.

A represents the trap, which is always full of water up to a level with the bottom of the waste-pipe inlet B and outlet C.

An enlarged chamber, D, is provided over the outlet or heel C of the trap, for the purpose of preventing the pipe acting from any cause as a siphon, so as to empty the trap, and permit thereby the escape of sewer gas or stench into the house. The air in the chamber D prevents any possibility of the siphoning of the trap or the emptying of the same by the pressure of the atmosphere.

The enlarged chamber D is flattened, so that its cross-section shall not exceed in width the width of a cross-section of the waste-pipe; the object of this being to enable it to fit in any excavation or opening which is sufficiently wide for the pipe, without necessitating a special opening or enlarged excavation to be made for its accommodation.

The inlet B is of equal thickness with the trap, while the outlet or longer leg, by its enlarged chamber, keeps up the automatic and reliable working of the trap, without the annoyances so common in the ordinary traps in use, and without getting out of order.

The chamber D is provided with a hand-hole and plug, E, at the top, for the purpose of giving easy access at any time for the cleaning of the trap.

The trap is principally intended for the outside of the house, but may also be used with advantage inside, under basins, slop-sinks, and under water-fixtures in general.

Having thus described our invention, we claim as new and desire to secure by Letters Patent—

As an improvement in sewer-traps, the raised and flattened air-chamber D, rectangular in shape, and cast or made in one piece with the trap or bend A over its heel or outlet C, the said chamber being of no greater width than the trap, so as to form at all times an air-cushion in the upper part of the chamber, substantially as and for the purpose herein shown and set forth.

THEODORE STARBUCK.
CHARLES PATRICK SMALL.

Witnesses:
W. M. MILLS,
E. S. FITTROUER.